(12) United States Patent
Nakata

(10) Patent No.: US 11,141,799 B2
(45) Date of Patent: Oct. 12, 2021

(54) DRILL

(71) Applicant: SUMITOMO ELECTRIC HARDMETAL CORP., Itami (JP)

(72) Inventor: Shinya Nakata, Mie-gun (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 192 days.

(21) Appl. No.: 16/316,777

(22) PCT Filed: May 11, 2018

(86) PCT No.: PCT/JP2018/018283
§ 371 (c)(1),
(2) Date: Jan. 10, 2019

(87) PCT Pub. No.: WO2018/230218
PCT Pub. Date: Dec. 20, 2018

(65) Prior Publication Data
US 2019/0232383 A1    Aug. 1, 2019

(30) Foreign Application Priority Data
Jun. 13, 2017  (JP) .............................. JP2017-116019

(51) Int. Cl.
*B23B 51/02*  (2006.01)
*B23B 27/14*  (2006.01)
*B23C 5/24*  (2006.01)

(52) U.S. Cl.
CPC ............ *B23B 51/02* (2013.01); *B23B 27/146* (2013.01); *B23B 2228/10* (2013.01);
(Continued)

(58) Field of Classification Search
CPC ..... B23B 51/00; B23B 51/02; B23B 2251/40; B23B 2251/406; B23B 2251/408;
(Continued)

(56) References Cited

U.S. PATENT DOCUMENTS 2,322,894 A * 6/1943 Stevens ................. B23B 51/02
  408/230
2,646,701 A * 7/1953 Letien .................... B23B 51/02
  408/56

(Continued)

FOREIGN PATENT DOCUMENTS

CN    1218427 A    6/1999
DE    3826239 A1   2/1990
(Continued)

*Primary Examiner* — Eric A. Gates
(74) *Attorney, Agent, or Firm* — Baker Botts L.L.P.; Michael A. Sartori

(57) ABSTRACT

The drill has a rake face, a flank face, and an outer circumferential surface. The flank face is continuous to the rake face. The outer circumferential surface is continuous to both the rake face and the flank face. A ridgeline between the rake face and the flank face constitutes a cutting edge. A ridgeline between the rake face and the outer circumferential surface constitutes an outer circumferential end. A groove is provided cyclically in the rake face to extend at an angle relative to an axis of the drill, the angle being larger than a helix angle of the drill. The groove has a depth of more than or equal to 1.5 μm.

13 Claims, 7 Drawing Sheets

(52) U.S. Cl.
CPC ..... *B23B 2228/105* (2013.01); *B23B 2251/04* (2013.01); *B23B 2251/406* (2013.01); *B23C 5/2403* (2013.01); *B23C 2226/00* (2013.01)

(58) Field of Classification Search
CPC ...... B23B 2260/072; B23B 2260/0725; B23B 27/14; B23B 27/143; B23B 27/145; B23B 27/146; B23B 2228/10; B23B 2228/105; B23B 2226/00; B23B 2226/31; B23B 2226/315; B23C 5/2403
See application file for complete search history.

(56) References Cited

U.S. PATENT DOCUMENTS

| | | | | |
|---|---|---|---|---|
| 4,507,028 | A | * | 3/1985 | Matsushita ............ B23B 51/08 408/227 |
| 5,074,728 | A | * | 12/1991 | Hsu .................... F16B 25/0078 411/304 |
| 5,160,232 | A | * | 11/1992 | Maier ................... B23B 51/02 407/54 |
| 5,437,343 | A | * | 8/1995 | Cooley ............... E21B 10/5673 175/431 |
| 5,452,971 | A | * | 9/1995 | Nevills ................. B23B 51/00 408/229 |
| 5,503,237 | A | * | 4/1996 | Neukirchen ......... E21B 10/445 175/323 |
| 5,701,578 | A | * | 12/1997 | Liu .......................... B22F 3/24 419/29 |
| 5,716,170 | A | * | 2/1998 | Kammermeier ........ B23B 51/02 407/119 |
| 5,807,039 | A | * | 9/1998 | Booher .................. B23B 51/02 408/224 |
| 5,967,710 | A | * | 10/1999 | Krenzer ................ B23B 27/141 408/224 |
| 6,213,692 | B1 | * | 4/2001 | Guehring ............... B23B 51/02 408/144 |
| 7,131,799 | B2 | * | 11/2006 | Stokey ................ B23B 51/0009 408/230 |
| 7,278,805 | B2 | * | 10/2007 | Ley ..................... B23B 27/1607 407/107 |
| 8,876,445 | B2 | * | 11/2014 | Yanagida ............... B23B 51/02 408/227 |
| 9,144,845 | B1 | * | 9/2015 | Grzina .................... B23B 27/00 |
| 2004/0067115 | A1 | | 4/2004 | Yamamoto |
| 2007/0166545 | A1 | | 7/2007 | Tanibuchi et al. |
| 2015/0231703 | A1 | * | 8/2015 | Bjormander .......... B23B 27/146 428/162 |
| 2015/0314378 | A1 | * | 11/2015 | Rogalla .................. B23B 51/02 408/230 |
| 2016/0175944 | A1 | * | 6/2016 | Lyu ........................ B23B 51/02 407/54 |
| 2021/0039175 | A1 | * | 2/2021 | Shamoto ................ B23B 51/00 |

FOREIGN PATENT DOCUMENTS

| | | | |
|---|---|---|---|
| EP | 2006040 A2 | 12/2008 | |
| EP | 2213397 A1 | 8/2010 | |
| EP | 3135411 A1 | 3/2017 | |
| GB | 452750 A * | 8/1936 | ............ B23B 51/02 |
| GB | 993607 A * | 6/1965 | ............ B23B 51/02 |
| JP | 2004-181593 A | 7/2004 | |
| JP | 2005-319544 A | 11/2005 | |
| JP | 2006-082206 A | 3/2006 | |
| JP | 2007-111838 A | 5/2007 | |
| JP | 2007-245270 A | 9/2007 | |
| JP | 2013-075339 A | 4/2013 | |
| JP | 2013-146819 A | 8/2013 | |
| JP | 2013-212572 A | 10/2013 | |
| JP | 2014-193513 A | 10/2014 | |
| JP | 2016-500028 A | 1/2016 | |
| JP | 2017-094467 A | 6/2017 | |
| WO | 97/43068 A1 | 11/1997 | |
| WO | 2014060414 A1 | 4/2014 | |

\* cited by examiner

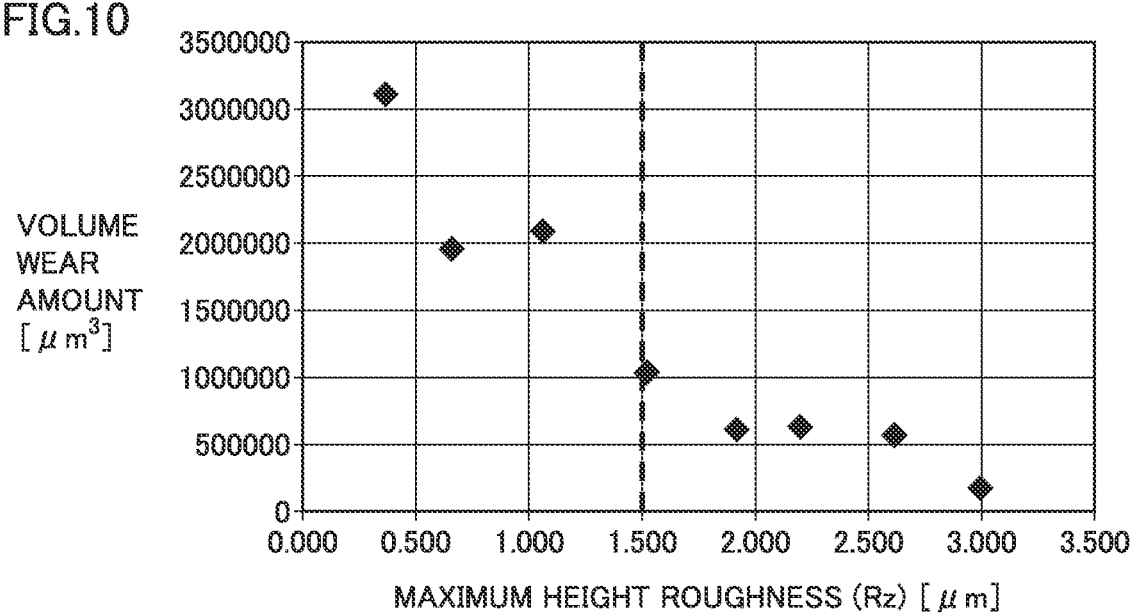

DRILL

TECHNICAL FIELD

The present invention relates to a drill. The present application claims a priority based on Japanese Patent Application No. 2017-116019 filed on Jun. 13, 2017, the entire content of which is incorporated herein by reference.

BACKGROUND ART

A cutting tool in which a surface coating film is provided on a substrate is described in each of Japanese National Patent Publication No. 2016-500028 (Patent Literature 1), Japanese Patent Laying-Open No. 2004-181593 (Patent Literature 2), Japanese Patent Laying-Open No. 2007-245270 (Patent Literature 3), and Japanese Patent Laying-Open No. 2013-212572 (Patent Literature 4). In the substrate of the cutting tool disclosed in Japanese National Patent Publication No. 2016-500028, a recess is provided. The recess is at least partially filled with the surface coating film.

CITATION LIST

Patent Literature

PTL 1: Japanese National Patent Publication No. 2016-500028
PTL 2: Japanese Patent Laying-Open No. 2004-181593
PTL 3: Japanese Patent Laying-Open No. 2007-245270
PTL 4: Japanese Patent Laying-Open No. 2013-212572

SUMMARY OF INVENTION

A drill according to one embodiment of the present invention includes: a rake face, a flank face, and an outer circumferential surface. The flank face is continuous to the rake face. The outer circumferential surface is continuous to both the rake face and the flank face. A ridgeline between the rake face and the flank face constitutes a cutting edge. A ridgeline between the rake face and the outer circumferential surface constitutes an outer circumferential end. A groove is provided cyclically in the rake face to extend at an angle relative to an axis of the drill, the angle being larger than a helix angle of the drill. The groove has a depth of more than or equal to 1.5 μm.

BRIEF DESCRIPTION OF DRAWINGS

FIG. 10 shows a relation between a volume wear amount and a maximum height roughness.

DETAILED DESCRIPTION

Figure 1:
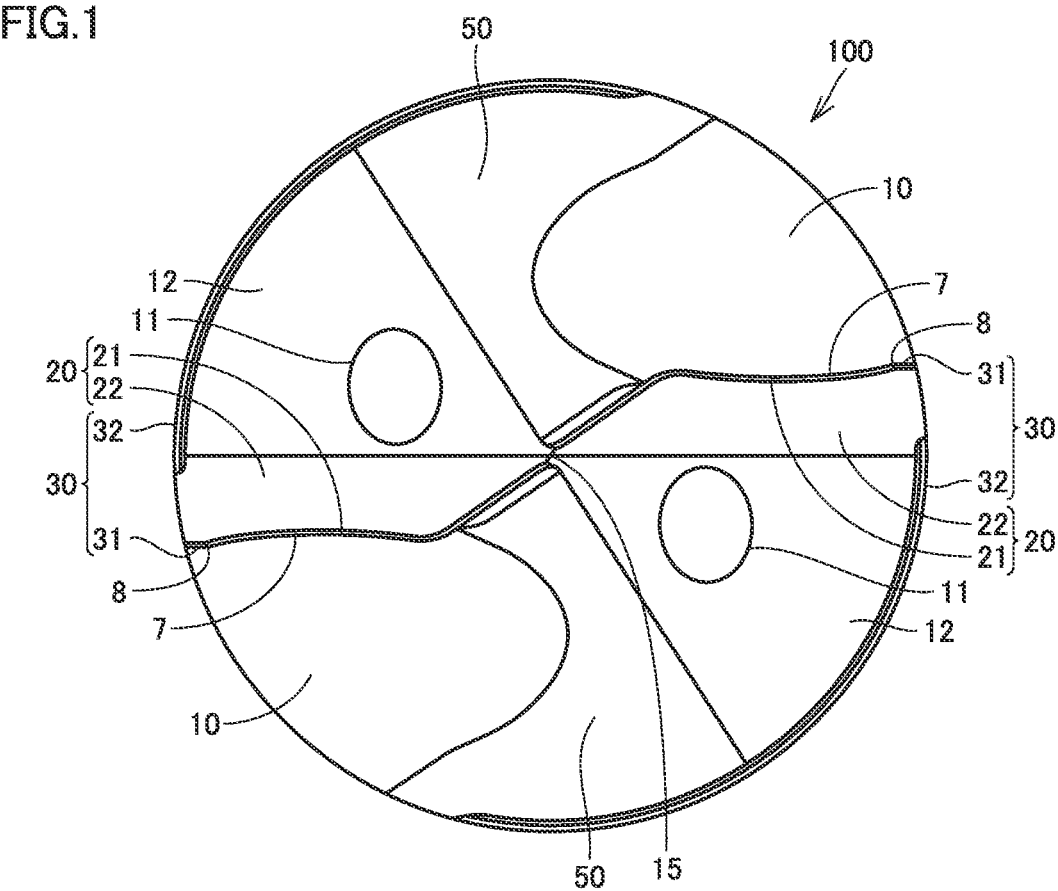
FIG. 1 is a schematic front view showing a configuration of a drill according to a first embodiment.

Problem to be Solved by the Present Disclosure

The width of the recess described in Japanese National Patent Publication No. 2016-500028 becomes wider toward an opening thereof. Accordingly, the upper surface of the surface coating film filling the recess is comparatively smooth. In the case where a rake face is comparatively smooth, a contact area between swarf and the rake face becomes large when the swarf passes in contact with the rake face during cutting. Accordingly, the rake face is likely to be to worn. Moreover, during cutting, the surface coating film is worn with passage of time. Accordingly, when an irregularity in the surface coating film is small, the irregularity is immediately worn, with the result that the rake face becomes smooth. As a result, a wear amount of the rake face becomes large.

As described above, in the cutting tool described in Japanese National Patent Publication No. 2016-500028, it is difficult to sufficiently suppress wear of the rake face.

An object of one embodiment of the present invention is to provide a drill, by which a rake face can be suppressed from being worn.

Advantageous Effect of the Present Disclosure

According to one embodiment of the present invention, there can be provided a drill, by which a rake face can be suppressed from being worn.

DESCRIPTION OF EMBODIMENTS

First, the following describes a summary of an embodiment of the present invention.

(1) A drill 100 according to one embodiment of the present invention includes: a rake face 10, a flank face 20, and an outer circumferential surface 30. Flank face 20 is continuous to rake face 10. Outer circumferential surface 30 is continuous to both rake face 10 and flank face 20. A ridgeline between rake face 10 and flank face 20 constitutes a cutting edge 7. A ridgeline between rake face 10 and outer circumferential surface 30 constitutes an outer circumferential end 8. A groove is provided cyclically in rake face 10 to extend at an angle $\theta_1$ relative to an axis A of drill 100, angle $\theta_1$ being larger than a helix angle $\theta_2$ of the drill. The groove has a depth of more than or equal to 1.5 μm. Since the groove is provided in the rake face, a contact area between the rake face and swarf is decreased. Hence, the rake face can be suppressed from being worn.

(2) Drill 100 according to (1) may have a substrate 5 and a coating film 6. Coating film 6 may be provided on substrate 5. Rake face 10, flank face 20, and outer circumferential surface 30 may be constituted of coating film 6. The groove may be a first groove 1 provided in coating film 6 and extending from cutting edge 7 toward outer circumferential end 8. First groove 1 has a depth of more than or equal to 1.5 μm.

First groove 1 is provided in rake face 10 of drill 100 according to (2) to extend from cutting edge 7 toward outer circumferential end 8, and first groove 1 has a depth H1 of more than or equal to 1.5 μm. Since the first groove is provided in the rake face, the contact area between the rake face and the swarf is decreased. Moreover, since the depth of the first groove is more than or equal to 1.5 μm, even when a portion of the coating film is worn during cutting, a state with the decreased contact area between the rake face and the swarf can be maintained for a long time. Further, during cutting, lubricant is facilitated to flow from the cutting edge toward the outer circumferential end along the first groove. Accordingly, lubricity of the rake face is increased to reduce a load received from the swarf. As a result, the rake face can be suppressed from being worn.

(3) In drill 100 according to (2), a second groove 2 may be cyclically provided in substrate 5 at a location corresponding to first groove 1. Second groove 2 may have a depth of more than or equal to 1.5 μm. Accordingly, even when a protrusion of the substrate is partially exposed as a result of progress of wear to a depth approximately as large as the film thickness, the coating film remains in the second groove provided in the substrate. Generally, the substrate has a higher affinity for a workpiece several times than the coating film, so that when swarf passes in contact with the substrate, wear is progressed faster therein than in the coating film. Since the coating film remains in the second groove provided in the substrate, the substrate and the coating film are disposed alternately along the direction in which the swarf passes in contact therewith. Accordingly, the swarf can be suppressed from entirely coming into contact with the substrate. As a result, the progress of wear due to the swarf passing in contact therewith is decreased, whereby the rake face can be suppressed from being worn.

(4) In drill 100 according to any one of (1) to (3), rake face 10 may have a maximum height roughness (Rz) of more than or equal to 1.5 μm and less than or equal to 50 μm. Accordingly, the rake face can be further suppressed from being worn.

(5) In drill 100 according to (2) or (3), the drill may be configured to be rotatable around axis A. Coating film 6 may further include a flute portion continuous to rake face 10 and provided in a form of a helix around axis A.

(6) In drill 100 according to (5), a value obtained by subtracting helix angle θ2 from angle θ1 of an extending direction of the groove relative to axis A may be more than 0° and less than or equal to 15°.

(7) In drill 100 according to any one of (1) to (6), the groove may have a plurality of groove portions. A pitch between the plurality of groove portions may be more than or equal to 10 μm and less than or equal to 70 μm.

(8) In drill 100 according to (3), a thickness of coating film 6 may be larger than the depth of second groove 2. Accordingly, the second groove can be sufficiently filled with the coating film. Accordingly, even when a portion of a protrusion of the coating film is detached due to wear, the coating film having a sufficient thickness remains in the second groove provided in the substrate. As a result, a lubrication effect by the coating film can be maintained for a long time.

(9) In drill 100 according to any one of (2), (3), (5), (6), and (8), coating film 6 may further include a thinning face 50 continuous to both flank face 20 and rake face 10. A third groove 3 may be provided in rake face 10 to extend toward outer circumferential end 8 from a ridgeline between thinning face 50 and rake face 10. Accordingly, the progress of wear due to the swarf passing in contact therewith is decreased, whereby the rake face can be suppressed from being worn.

(10) In drill 100 according to (9), third groove 3 may have a depth of more than or equal to 1.5 μm. Accordingly, the progress of wear due to the swarf passing in contact therewith is decreased, whereby the rake face can be suppressed from being worn.

(11) In drill 100 according to (9) or (10), a maximum height roughness (Rz) of thinning face 50 may be smaller than a maximum height roughness (Rz) of rake face 10. Since the thinning face receives large pressure from the workpiece, pressure adhesion is likely to occur when the thinning face is rough. Since the maximum height roughness of the thinning face is smaller than the maximum height roughness of the rake face, the rake face can be suppressed from being worn while suppressing the pressure adhesion and suppressing wear of the thinning face.

(12) In drill 100 according to any one of (1) to (11), flank face 20 may have a cutting-edge treated face 21 and a main flank face portion 22, cutting-edge treated face 21 constituting cutting edge 7, main flank face portion 22 being continuous to cutting-edge treated face 21, main flank face portion 22 being inclined relative to cutting-edge treated face 21. A maximum height roughness ($R_z$) of cutting-edge treated face 21 may be smaller than a maximum height roughness ($R_z$) of rake face 10. Since the cutting-edge treated face receives large pressure from the workpiece, pressure adhesion is likely to occur when the cutting-edge treated face is rough. Since the maximum height roughness of the cutting-edge treated face is smaller than the maximum height roughness of the rake face, the rake face can be suppressed from being worn while suppressing the pressure adhesion and suppressing wear of the cutting-edge treated face.

(13) In drill 100 according to any one of (1) to (12), outer circumferential surface 30 may have a return face 31 and a main outer circumferential surface portion 32, return face 31 constituting outer circumferential end 8, main outer circumferential surface portion 32 being continuous to return face 31, main outer circumferential surface portion 32 being inclined relative to return face 31. A maximum height roughness (Rz) of return face 31 may be smaller than a maximum height roughness (Rz) of rake face 10. Since the return face receives large pressure from the workpiece, pressure adhesion is likely to occur when the return face is rough. Since the maximum height roughness of the return face is smaller than the maximum height roughness of the rake face, the rake face can be suppressed from being worn while suppressing the pressure adhesion and suppressing wear of the return face.

Details of Embodiments of the Present Invention

The following describes details of an embodiment (hereinafter, referred to as "the present embodiment") of the present invention based on figures. It should be noted that in the below-described figures, the same or corresponding portions are given the same reference characters and are not described repeatedly.

First Embodiment

First, a configuration of a drill according to a first embodiment will be described.

Figure 2:
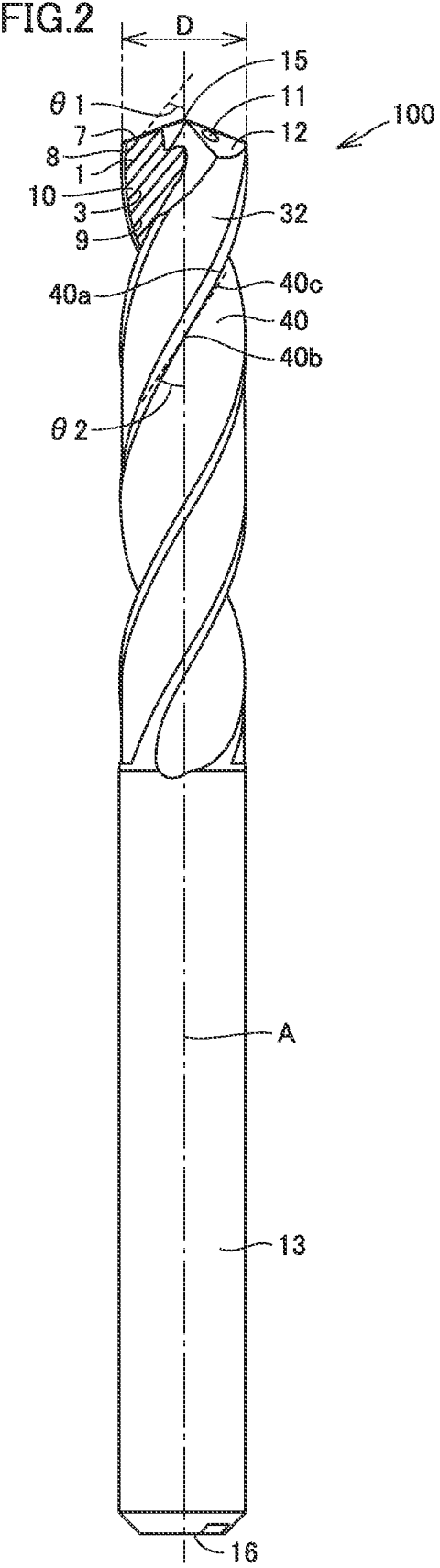
FIG. 2 is a schematic plan view showing the configuration of the drill according to the first embodiment.

As shown in FIG. 1 and FIG. 2, a drill 100 according to the first embodiment mainly has a rake face 10, a flank face 20, an outer circumferential surface 30, a thinning face 50, a backside flank face 12, a flute portion 40, a tip 15, a backside end portion 16, and a shank 13. Flank face 20 is continuous to rake face 10. A ridgeline between rake face 10 and flank face 20 constitutes a cutting edge 7. Outer circumferential surface 30 is continuous to both rake face 10 and flank face 20. A ridgeline between rake face 10 and outer circumferential surface 30 constitutes an outer circumferential end 8. Thinning face 50 is provided opposite to outer circumferential surface 30 relative to flank face 20. Thinning face 50 is continuous to both flank face 20 and rake face 10. Thinning face 50 is continuous to tip 15.

Drill 100 is configured to be rotatable around an axis A. Flute portion 40 is provided in the form of a helix around axis A. Flute portion 40 is continuous to rake face 10. Backside flank face 12 is disposed at the backside relative to flank face 20 in a rotation direction. Backside flank face 12 is continuous to flank face 20. Backside flank face 12 is inclined relative to flank face 20. Backside flank face 12 may extend toward backside end portion 16 from a boundary between backside flank face 12 and flank face 20. A lubricant supply hole 11 is provided in backside flank face 12, for example. Lubricant supply hole 11 may extend through shank 13 and may open at backside end portion 16.

Figure 3:
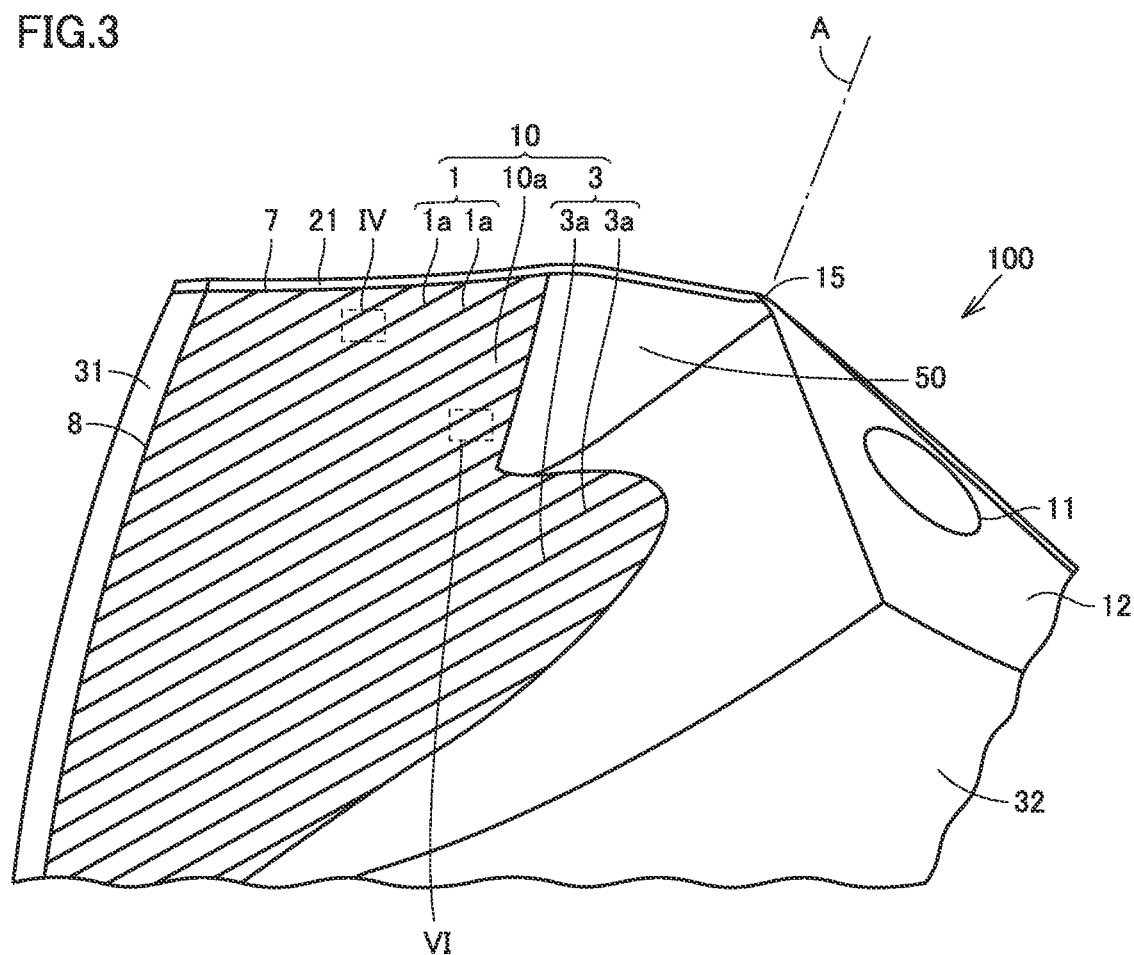
FIG. 3 is a schematic perspective view showing a configuration of a rake face of the drill according to the first embodiment.

As shown in FIG. 1 and FIG. 3, flank face 20 may have a cutting-edge treated face 21 and a main flank face portion 22. Cutting-edge treated face 21 constitutes cutting edge 7. Main flank face portion 22 is continuous to cutting-edge treated face 21. Main flank face portion 22 is inclined relative to cutting-edge treated face 21. Main flank face portion 22 is located at the backside relative to cutting-edge treated face 21 in the rotation direction. Main flank face portion 22 is continuous to tip 15, and extends from tip 15 in the outer circumferential direction. Cutting-edge treated face 21 may be separated from tip 15. Cutting-edge treated face 21 is continuous to rake face 10.

As shown in FIG. 1 and FIG. 3, outer circumferential surface 30 may have a return face 21 and a main outer circumferential surface portion 32. Return face 21 constitutes outer circumferential end 8. Main outer circumferential surface portion 32 is continuous to return face 31. Main outer circumferential surface portion 32 is inclined relative to return face 31. Return face 31 is continuous to cutting-edge treated face 21. Return face 31 extends from cutting-edge treated face 21 toward backside end portion 16. Return face 31 is continuous to rake face 10. Main outer circumferential surface portion 32 is located at the backside relative to return face 31 in the rotation direction.

As shown in FIG. 2 and FIG. 3, a first groove 1 is provided in rake face 10.

First groove 1 extends from cutting edge 7 toward outer circumferential end 8. First groove 1 is continuous to cutting edge 7. First groove 1 is continuous to outer circumferential end 8. First groove 1 has a plurality of first groove portions 1a. Each of the plurality of first groove portions 1a extends from cutting edge 7 toward outer circumferential end 8. Each of the plurality of first groove portions 1a is continuous to cutting edge 7. Each of the plurality of first groove portions 1a is continuous to outer circumferential end 8.

As shown in FIG. 2, first groove 1 is provided cyclically in rake face 10 so as to extend at an angle θ1 relative to axis A of the drill, angle θ1 being larger than a helix angle θ2 of the drill. When viewed in a direction perpendicular to axis A, angle θ1 of the extending direction of first groove 1 relative to axis A is larger than helix angle θ2 of flute portion 40 relative to axis A. It should be noted that helix angle θ2 of flute portion 40 refers to an angle formed by axis A and a tangent line 40c of a side end portion 40a at an intersection 40b between side end portion 40a of flute portion 40 and axis A, when viewed in the direction perpendicular to axis A. Angle θ1 of the extending direction of first groove 1 relative to axis A may be larger than helix angle θ2 of flute portion 40 by an angle of more than 0° and less than or equal to 15°. Helix angle θ2 is 30°, for example. Angle θ1 is more than or equal to 30° and less than or equal to 45°, for example. A value obtained by subtracting helix angle θ2 from angle θ1 may be more than or equal to 2° and less than or equal to 12°, or may be more than or equal to 4° and less than or equal to 9°.

Figure 4:
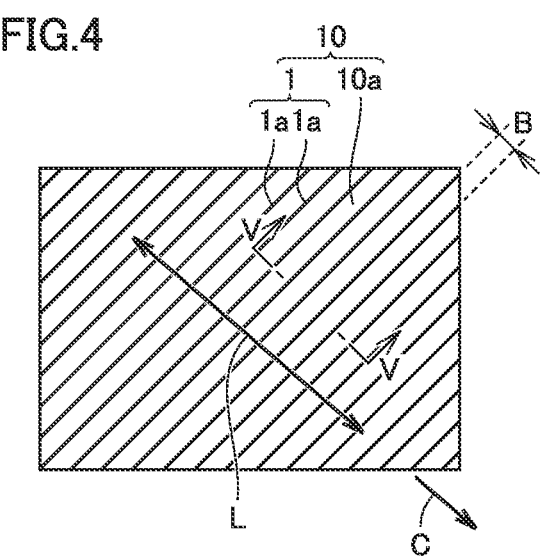
FIG. 4 is an enlarged schematic view of a region IV of FIG. 3.

As shown in FIG. 3 and FIG. 4, the plurality of first groove portions 1a may extend substantially in parallel with one another. When viewed in the direction perpendicular to rake face 10, a pitch B between the plurality of first groove portions 1a in the direction perpendicular to each of the plurality of first groove portions 1a is more than or equal to 10 μm and less than or equal to 70 μm, for example. Pitch B between the plurality of first groove portions 1a may be more than or equal to 15 μm and less than or equal to 65 μm, or may be more than or equal to 20 μm and less than or equal to 50 μm, for example. About three or more and twenty or less first groove portions 1a are provided in a length range L (see FIG. 4) of about 200 μm.

Figure 5:
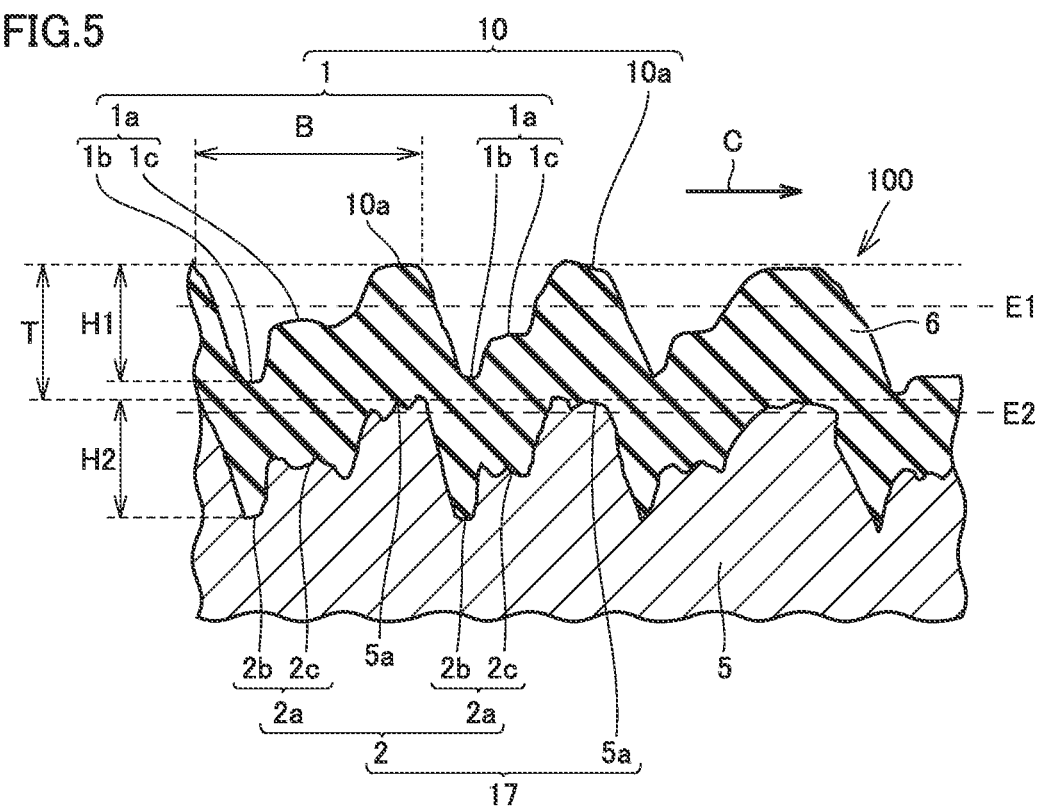
FIG. 5 is a schematic cross sectional view along a V-V line of FIG. 4.

As shown in FIG. 5, drill 100 may have a substrate 5 and a coating film 6. Coating film 6 is provided on substrate 5. Rake face 10, flank face 20, outer circumferential surface 30, thinning face 50, backside flank face 12, and flute portion 40 are constituted of coating film 6. In other words, coating film 6 includes rake face 10, flank face 20, outer circumferential surface 30, thinning face 50, backside flank face 12, and flute portion 40. Basically, coating film 6 is provided on the entire surface of substrate 5; however, a portion of substrate 5 may be exposed through coating film 6.

For substrate 5, a cemented carbide is used, for example. The cemented carbide is a sintered material including WC (tungsten carbide) powder or the like and a binder such as Co (cobalt). It should be noted that substrate 5 is not be limited to the cemented carbide and may be cermet, ceramic, or the like, for example. Coating film 6 is a layer containing a diamond crystal, for example. Coating film 6 is a film including diamond, for example. Coating film 6 may be a DLC (Diamond Like Carbon), or may be a diamond polycrystal film, for example.

As shown in FIG. 5, first groove 1 may be provided in coating film 6. A depth H1 of first groove 1 is more than or equal to 1.5 μm. Depth H1 of first groove 1 may be more than or equal to 1.9 μm or may be more than or equal to 2.4 μm, for example. The upper limit of depth H1 of first groove 1 is less than or equal to 50 μm, for example. A second groove 2 is provided in substrate 5 at a location corresponding to first groove 1. When first groove 1 has the plurality of first groove portions 1a, a plurality of respective second groove portions 2a corresponding to the plurality of first groove portions 1a are provided in substrate 5. Coating film 6 is in contact with upper surface 17 of substrate 5. Coating film 6 is provided inside first groove 1 provided in substrate 5 to fill first groove 1.

Rake face 10 has an upper end surface 10a and is provided with the plurality of first groove portions 1a. Each of the plurality of first groove portions 1a has a maximum depth portion 1b and a flat portion 1c. In one pitch B, maximum depth portion 1b, flat portion 1c, and upper end surface 10a are provided. In a direction parallel to upper end surface 10a, flat portion 1c is located between maximum depth portion 1b and upper end surface 10a. Maximum depth portion 1b serves as a recess as compared with flat portion 1c. Upper end surface 10a serves as a protrusion as compared with flat portion 1c. In other words, flat portion 1c is formed at a depth between maximum depth portion 1b and upper end surface 10a.

With this configuration, even when coating film 6 is worn to a wear location E1 (see FIG. 5) due to, for example, swarf passing in contact therewith, an area of contact with the passing swarf can be suppressed from being increased. Accordingly, the swarf is only in abutment with a portion of the upper surface of coating film 6, rather than the entire upper surface thereof. As a result, a state with the decreased contact area can be maintained for a long time. Moreover, even when wear is progressed to a wear location E2 (see FIG. 5) to expose a portion of substrate 5, coating film 6 with high lubricity remains on maximum depth portion 1b and flat portion 1c. Accordingly, the swarf can be suppressed from being in abutment with the entire upper surface of substrate 5. Therefore, as compared with a case where the upper surface of substrate 5 is smooth, the lubrication effect of coating film 6 can be maintained for a longer time. As a result, progress of wear can be suppressed, thus realizing a long life of the drill.

Depth H2 of second groove 2 may be substantially the same as depth H1 of first groove 1, or may be larger than the depth of first groove 1. Depth H2 of second groove 2 is more than or equal to 1.5 µm, for example. Depth H2 of second groove 2 may be more than or equal to 1.9 µm, or may be more than or equal to 2.4 µm, for example. The upper limit of depth H2 of second groove 2 may be less than or equal to 50 µm, may be less than or equal to 10 µm, or may be less than or equal to 5 µm, for example. Thickness T of coating film 6 may be larger than depth H2 of second groove 2. Similarly, thickness T of coating film 6 may be larger than depth H1 of first groove 1. Thickness T of coating film 6 is more than or equal to 1 µm and less than or equal to 5 µm, for example. Thickness T of coating film 6 is a thickness of coating film 6 on substantially flat upper end surface 5a of substrate 5.

Upper surface 17 of substrate 5 has upper end surface 5a and is provided with the plurality of second groove portions 2a. Each of the plurality of second groove portions 2a has a maximum depth portion 2b and a flat portion 2c. In one pitch B, maximum depth portion 2b, flat portion 2c, and upper end surface 5a are provided. In a direction parallel to upper end surface 5a, flat portion 2c is located between maximum depth portion 2b and upper end surface 5a. Maximum depth portion 2b serves as a recess as compared with flat portion 2c. Upper end surface 5a serves as a protrusion as compared with flat portion 2c. In other words, flat portion 2c is formed at a depth between maximum depth portion 2b and upper end surface 5a.

As shown in FIG. 2 and FIG. 3, a third groove 3 is provided in rake face 10.

Figure 6:
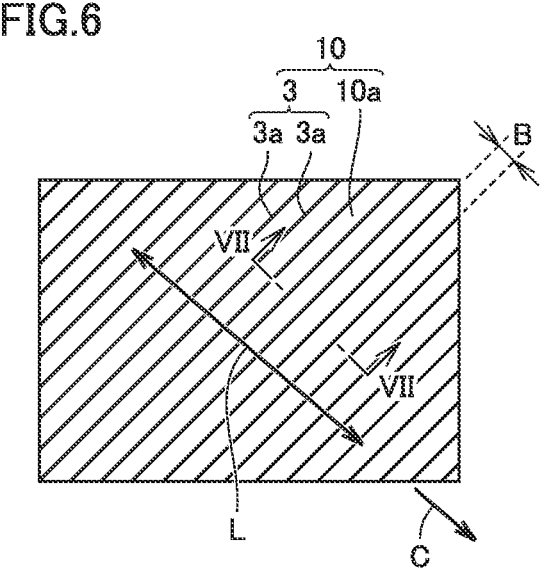
FIG. 6 is an enlarged schematic view of a region VI of FIG. 3.

Third groove 3 extends toward outer circumferential end 8 from the ridgeline between thinning face 50 and rake face 10. Third groove 3 is continuous to the ridgeline between thinning face 50 and rake face 10. Third groove 3 is continuous to outer circumferential end 8. Third groove 3 has a plurality of third groove portions 3a. Each of the plurality of third groove portions 3a extends toward outer circumferential end 8 from the ridgeline between thinning face 50 and rake face 10. Each of the plurality of third groove portions 3a may be continuous to the ridgeline between thinning face 50 and rake face 10. Each of the plurality of third groove portions 3a may be continuous to outer circumferential end 8. As shown in FIG. 6, the plurality of third groove portions 3a may extend substantially in parallel with one another. The configuration of third groove portion 3a is the same as that of first groove portion 1a except for the regions in which they are disposed.

Figure 7:
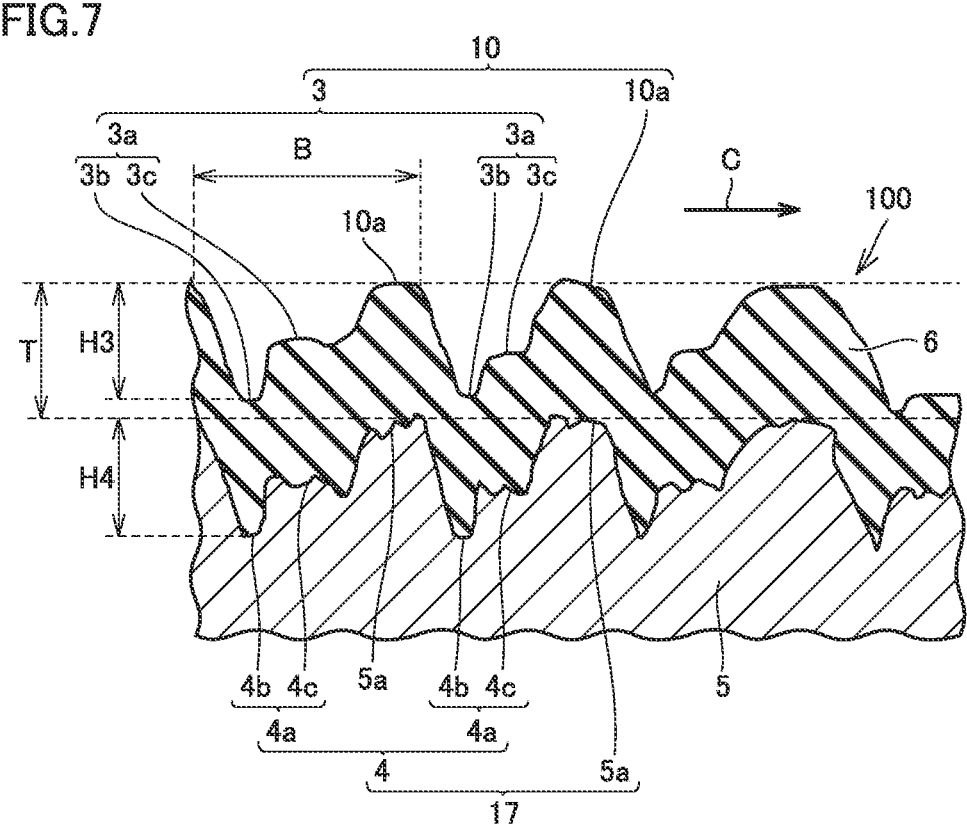
FIG. 7 is a schematic cross sectional view along a VII-VII line of FIG. 6.

As shown in FIG. 7, a depth H3 of third groove 3 is the same as depth H1 of first groove 1. That is, depth H3 of third groove 3 is more than or equal to 1.5 µm, for example. Depth H3 of third groove 3 may be more than or equal to 1.9 µm, or may be more than or equal to 2.4 µm, for example. The upper limit of depth H3 of third groove 3 is less than or equal to 50 µm, for example. As with first groove 1, substrate 5 is provided with a fourth groove 4 at a location corresponding to third groove 3. When third groove 3 has the plurality of third groove portions 3a, substrate 5 is provided with a plurality of respective fourth groove portions 4a corresponding to the plurality of respective third groove portions 3a. Coating film 6 is provided inside third groove 3 provided in substrate 5 to fill third groove 3. Rake face 10 is provided with the plurality of third groove portions 3a. Each of the plurality of third groove portions 3a has a maximum depth portion 3b and a flat portion 3c.

A depth H4 of fourth groove 4 is the same as depth H2 of second groove 2. Depth H4 of fourth groove 4 may be substantially the same as depth H3 of third groove 3, or may be larger than the depth of third groove 3. That is, depth H4 of fourth groove 4 is more than or equal to 1.5 µm, for example. Depth H4 of fourth groove 4 may be more than or equal to 1.9 µm, or may be more than or equal to 2.4 µm, for example. The upper limit of depth H4 of fourth groove 4 may be less than or equal to 50 µm, may be less than or equal to 10 µm, or may be less than or equal to 5 µm, for example. Thickness T of coating film 6 may be larger than depth H4 of fourth groove 4. Similarly, thickness T of coating film 6 may be larger than depth H3 of third groove 3. Upper surface 17 of substrate 5 is provided with the plurality of fourth groove portions 4a. Each of the plurality of fourth groove portions 4a has a maximum depth portion 4b and a flat portion 4c. The configuration of fourth groove portion 4a is the same as that of second groove portion 2a except for the regions in which they are disposed.

Rake face 10 has a maximum height roughness ($R_z$) of more than or equal to 1.5 µm, for example. The maximum height roughness ($R_z$) of rake face 10 may be more than or equal to 1.9 µm, or may be more than or equal to 2.4 µm, for example. The upper limit of the maximum height roughness ($R_z$) of rake face 10 may be less than or equal to 50 µm, may be less than or equal to 10 µm, or may be less than or equal to 5 µm, for example. The maximum height roughness ($R_z$) of thinning face 50 may be smaller than the maximum height roughness ($R_z$) of rake face 10. The maximum height roughness ($R_z$) of cutting-edge treated face 21 may be smaller than the maximum height roughness ($R_z$) of rake face 10. The maximum height roughness ($R_z$) of return face 31 may be smaller than the maximum height roughness ($R_z$) of rake face 10.

As shown in FIG. 2, a fifth groove 9 may be provided in rake face 10. Fifth groove 9 extends to be continuous to outer circumferential end 8. Fifth groove 9 is separated from cutting edge 7 and thinning face 50. Fifth groove 9 may be provided in flute portion 40. The depth of fifth groove 9 may be substantially the same as the depth of first groove 1 in the vicinity of the cutting edge. Fifth groove 9 may be provided in a region in a distance from tip 15 to a location twice as large as drill diameter D in the direction of axis A, or may be provided in the entire flute portion 40. Accordingly, wear can be decreased when the swarf passes in contact with the flute portion.

(Methods for Measuring Depth of Groove and Maximum Height Roughness of Rake Face)

Next, the following describes methods for measuring the depth of each groove and the maximum height roughness of the rake face.

For the measurement of the depth of the groove and the maximum height roughness, a laser microscope (model number: VK-X100) provided by KEYENCE is used, for example. First, the drill is disposed in a V-shaped groove provided in a block. The drill is disposed such that the cutting edge of the drill is horizontal to a lens of the laser microscope. The visual field magnification of the laser microscope is about ×1000. As shown in FIG. 4, the laser microscope captures an image of a region IV (see FIG. 3) of the rake face away from the cutting edge by about 0.1 mm.

In FIG. 4, in length range L of 200 µm in a direction C perpendicular to the extending direction of the first groove, a profile of the captured region in the height direction is measured and the maximum height roughness ($R_z$) in the rake face is measured. The maximum height roughness ($R_z$) is calculated based on "ISO4287:1997" of the International Standardization Organization. Moreover, in the profile of the captured region in the height direction, the portion provided with first groove 1 and substantially flat upper end surface 10*a* provided with no first groove 1 are specified. A distance between the height of the bottom portion of first groove 1 and the average height of substantially flat upper end surface 10*a* is calculated as depth H1 of first groove 1.

Depth H2 of second groove 2 of substrate 5 may be measured based on an image of an interface between the substrate and the coating film in a cross section of the drill along a V-V line of FIG. 4. The image is captured using a microscope or the like.

Next, the following describes function and effect of the drill according to the first embodiment.

According to drill 100 according to the first embodiment, the groove is provided cyclically in rake face 10 to extend at angle θ1 relative to axis A of the drill, angle θ1 being larger than helix angle θ2 of the drill. The groove has a depth of more than or equal to 1.5 µm. Accordingly, a contact area between the rake face and the swarf is decreased. Hence, the rake face can be suppressed from being worn.

Moreover, according to drill 100 according to the first embodiment, first groove 1 is provided in rake face 10 of drill 100 to extend from cutting edge 7 toward outer circumferential end 8, and first groove 1 has a depth H1 of more than or equal to 1.5 µm. Since the first groove is provided in the rake face, the contact area between the rake face and the swarf is decreased. Moreover, since the depth of the first groove is more than or equal to 1.5 µm, even when a portion of the coating film is worn during cutting, a state with the decreased contact area between the rake face and the swarf can be maintained for a long time. Further, during cutting, lubricant is facilitated to flow from the cutting edge toward the outer circumferential end along the first groove. Accordingly, lubricity of the rake face is increased to reduce a load received from the swarf. As a result, the rake face can be suppressed from being worn.

Further, according to drill 100 according to the first embodiment, second groove 2 is cyclically provided in substrate 5 at the location corresponding to first groove 1. The depth of second groove 2 is more than or equal to 1.5 µm. Accordingly, even when the protrusion of the substrate is partially exposed as a result of progress of wear to a depth approximately as large as the film thickness, the coating film remains in the second groove provided in the substrate. Generally, the substrate has a higher affinity for a workpiece several times than the coating film, so that when swarf passes in contact with the substrate, wear is progressed faster therein than in the coating film. Since the coating film remains in the second groove provided in the substrate, the substrate and the coating film are disposed alternately along the direction in which the swarf passes in contact therewith. Accordingly, the swarf can be suppressed from entirely coming into contact with the substrate. As a result, the progress of wear due to the swarf passing in contact therewith is decreased, whereby the rake face can be suppressed from being worn.

Further, according to drill 100 according to the first embodiment, the maximum height roughness (Rz) of rake face 10 is more than or equal to 1.5 µm and less than or equal to 50 µm. Accordingly, the rake face can be further suppressed from being worn.

Further, according to drill 100 according to the first embodiment, the thickness of coating film 6 is larger than the depth of the second groove. Accordingly, the second groove can be sufficiently filled with the coating film. Accordingly, even when a portion of the protrusion of the coating film is detached due to wear, the coating film having a sufficient thickness remains in the second groove provided in the substrate. As a result, the lubrication effect by the coating film can be maintained for a long time.

Further, according to drill 100 according to the first embodiment, coating film 6 further includes thinning face 50 continuous to both flank face 20 and rake face 10. Third groove 3 is provided in rake face 10 to extend toward outer circumferential end 8 from the ridgeline between thinning face 50 and rake face 10. Accordingly, the progress of wear due to the swarf passing in contact therewith is decreased, whereby the rake face can be suppressed from being worn.

Further, according to drill 100 according to the first embodiment, the depth of third groove 3 is more than or equal to 1.5 µm. Accordingly, the progress of wear due to the swarf passing in contact therewith is decreased, whereby the rake face can be suppressed from being worn.

Further, according to drill 100 according to the first embodiment, the maximum height roughness (Rz) of thinning face 50 is smaller than the maximum height roughness (Rz) of rake face 10. Since the thinning face receives large pressure from the workpiece, pressure adhesion is likely to occur when the thinning face is rough.

Since the maximum height roughness of the thinning face is smaller than the maximum height roughness of the rake face, the rake face can be suppressed from being worn while suppressing the pressure adhesion and suppressing wear of the thinning face.

Further, according to drill 100 according to the first embodiment, flank face 20 has cutting-edge treated face 21 and main flank face portion 22, cutting-edge treated face 21 constituting cutting edge 7, main flank face portion 22 being continuous to cutting-edge treated face 21, main flank face portion 22 being inclined relative to cutting-edge treated face 21. The maximum height roughness ($R_z$) of cutting-edge treated face 21 is smaller than the maximum height roughness ($R_z$) of rake face 10. Since the cutting-edge treated face receives large pressure from the workpiece, pressure adhesion is likely to occur when the cutting-edge treated face is rough. Since the maximum height roughness of the cutting-edge treated face is smaller than the maximum height roughness of the rake face, the rake face can be suppressed from being worn while suppressing the pressure adhesion and suppressing wear of the cutting-edge treated face.

Further, according to drill 100 according to the first embodiment, outer circumferential surface 30 has return face 31 and main outer circumferential surface portion 32, return face 31 constituting outer circumferential end 8, main outer circumferential surface portion 32 being continuous to return face 31, main outer circumferential surface portion 32 being inclined relative to return face 31. The maximum height roughness (Rz) of return face 31 is smaller than the maximum height roughness (Rz) of rake face 10. Since the return face receives large pressure from the workpiece, pressure adhesion is likely to occur when the return face is rough. Since the maximum height roughness of the return face is smaller than the maximum height roughness of the rake face, the rake face can be suppressed from being worn while suppressing the pressure adhesion and suppressing wear of the return face.

Second Embodiment

Next, the following describes a configuration of a drill according to a second embodiment.

The drill according to the second embodiment is different from the drill according to the first embodiment in terms of the following configuration: thickness T of coating film 6 is smaller than depth H2 of second groove 2. The other configurations of the drill according to the second embodiment are the same as those of the drill according to the first embodiment. In the description below, the configuration different from that of the drill according to the first embodiment will be mainly described.

Figure 8:
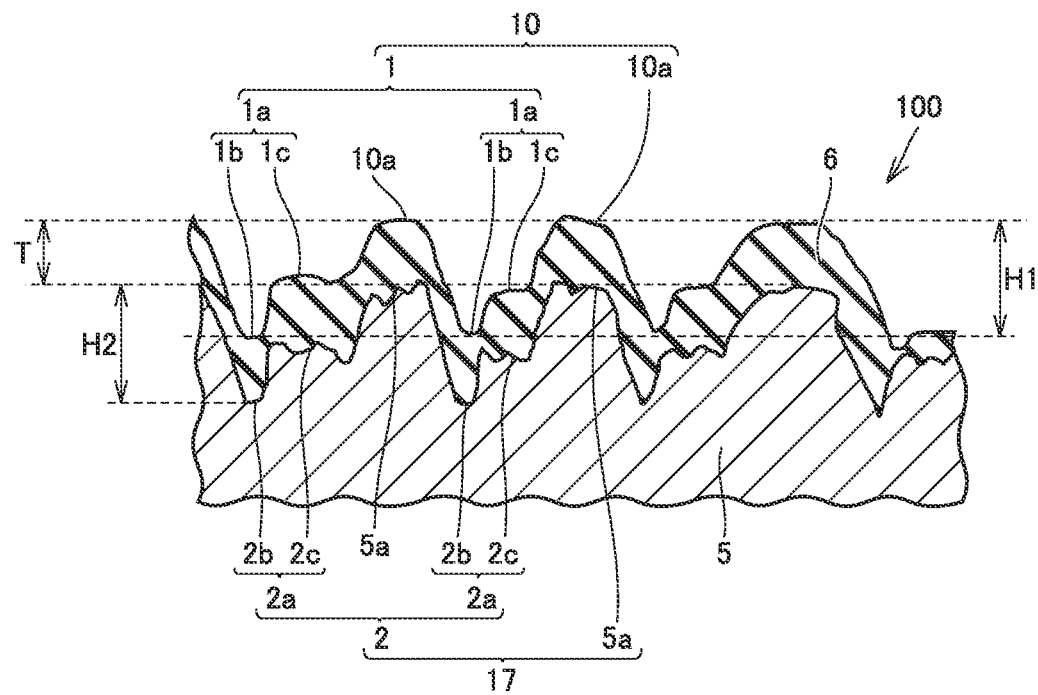
FIG. 8 is a schematic cross sectional view showing a configuration of a drill according to a second embodiment, and corresponds to a field of view of the drill of the first embodiment in FIG. 5.

As shown in FIG. 8, thickness T of coating film 6 may be smaller than depth H1 of first groove 1. Similarly, thickness T of coating film 6 may be smaller than depth H2 of second groove 2. When each of depth H1 of first groove 1 and depth H2 of second groove 2 is more than or equal to 2 μm, thickness T of coating film 6 is less than 2 μm, for example. Second groove 2 is provided in substrate 5 at the location corresponding to first groove 1. A portion of first groove 1 may extend into second groove 2. The height of the bottom portion of first groove 1 may be lower than the height of substantially flat upper end surface 5a.

Figure 9:
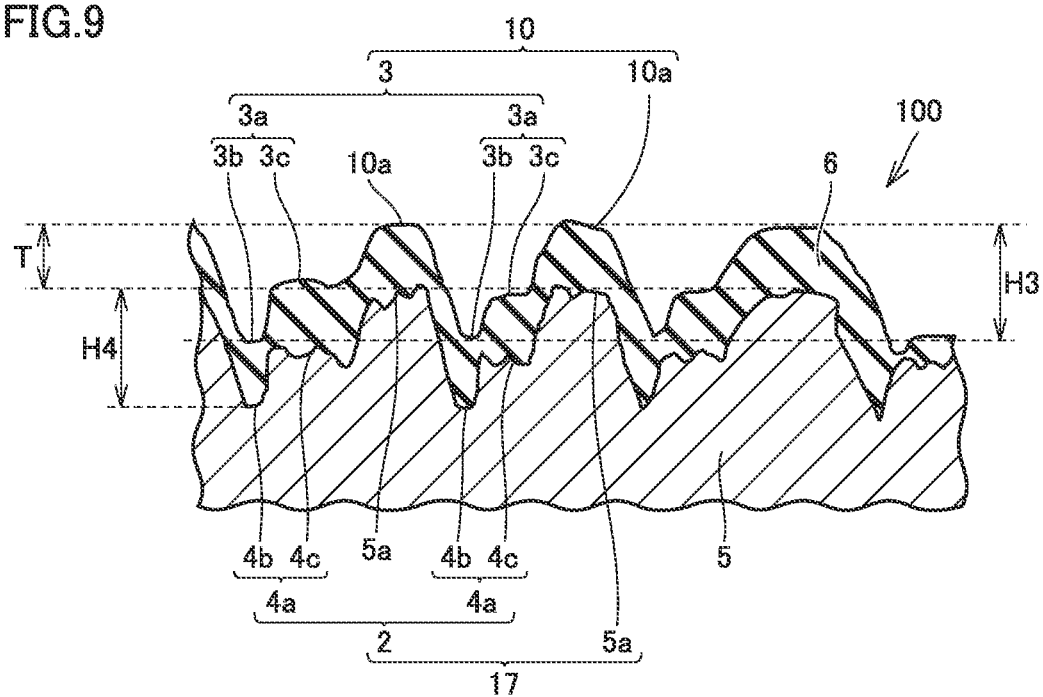
FIG. 9 is a schematic cross sectional view showing the configuration of the drill according to the second embodiment, and corresponds to a field of view of the drill of the first embodiment in FIG. 7.

As shown in FIG. 9, thickness T of coating film 6 may be smaller than depth H3 of third groove 3. Similarly, thickness T of coating film 6 may be smaller than depth H4 of fourth groove 4. When each of depth H3 of third groove 3 and depth H4 of fourth groove 4 is more than or equal to 2 μm, thickness T of coating film 6 is less than 2 μm, for example. Fourth groove 4 is provided in substrate 5 at the location corresponding to third groove 3. A portion of third groove 3 may extend into fourth groove 4. The height of the bottom portion of third groove 3 may be lower than the height of substantially flat upper end surface 5a.

In each of the above-described embodiments, it has been described that drill 100 has substrate 5 and coating film 6; however, drill 100 may not have coating film 6. In this case, the groove (second groove 2) is provided in rake face 10 of substrate 5. When drill 100 does not have coating film 6, rake face 10, flank face 20, outer circumferential surface 30, thinning face 50, backside flank face 12, and flute portion 40 are constituted of substrate 5.

EXAMPLES (Preparation of Samples)

First, there were prepared drills of samples 1 to 8 different from one another in terms of the maximum height roughness in the rake face. The respective maximum height roughnesses ($R_z$) in rake faces 10 (see FIG. 3) of the drills of samples 1 to 8 were 0.37 μm, 0.66 μm, 1.05 μm, 1.52 μm, 1.93 μm, 2.20 μm, 2.62 μm and 3.00 μm. Since the maximum height roughness of each rake face follows the maximum height roughness of the substrate, the maximum height roughness of each rake face was adjusted by changing depth H2 of second groove 2 formed in substrate 5. Second groove 2 was formed by polishing the substrate using a grindstone. The depth of second groove 2 was adjusted by changing a feed rate of the grindstone. By forming coating film 6 on substrate 5 after providing second groove 2 in substrate 5, first groove 1 was formed in coating film 6. The maximum height roughness ($R_z$) in rake face 10 constituted of coating film 6 was measured by a laser microscope (model number: VK-X100) provided by KEYENCE.

(Evaluation Method)

Next, a cutting test was performed using each of the drills of samples 1 to 8. A workpiece was S50 C. A circumferential speed was set to 80 mm/minute. Feeding was set to 0.25 mm/rotation. Through holes were formed and the depth of each hole was 38 mm. A vertical machining center was used as a facility. Emulsion was internally supplied. A supply pressure was set to 2.01 MPa. The number of cutting holes was 1600. A wear amount of the rake face was measured after the cutting test. Specifically, a microscope (model number: VHX-5000) provided by KEYENCE was used to measure an area of a wear portion. Specifically, the drill was disposed in a groove of a block such that the cutting edge of the drill was horizontal. An image of the rake face was captured by a laser microscope. The captured image was binarized to determine the area of the wear portion. Next, the depth of the wear portion was measured. Specifically, a laser microscope (model number: VK-X100) provided by KEYENCE was used to measure the depth of the wear portion. Specifically, a cross sectional profile at the central location of the cutting edge was measured and the depth of the wear portion was determined based on the cross sectional profile. A value of the half of a product of the area ($\mu m^2$) of the wear portion and the depth (μm) of the wear portion was defined as a volume wear amount ($\mu m^3$).

(Evaluation Result)

FIG. 10 shows a relation between the volume wear amount of the rake face and the maximum height roughness ($R_z$) of the rake face. As shown in FIG. 10, it was confirmed that the volume wear amount of the rake face is decreased as the maximum height roughness ($R_z$) of the rake face becomes larger. Particularly, it was confirmed that the volume wear amount of the rake face is significantly decreased when the maximum height roughness of the rake face is more than or equal to 1.5 μm and less than or equal to 5 μm.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: first groove; 1a: first groove portion; 1b, 2b, 3b, 4b: maximum depth portion; 1c, 2c, 3c, 4c: flat portion; 2: second groove; 2a: second groove portion; 3: third groove; 3a: third groove portion; 4: fourth groove; 4a: fourth groove portion; 5: substrate; 5a, 10a: upper end surface; 6: coating film; 7: cutting edge; 8: outer circumferential end; 9: fifth groove; 10: rake face; 11: lubricant supply hole; 12: backside flank face; 13: shank; 15: tip; 16: backside end portion; 17: upper surface; 20: flank face; 21: cutting-edge treated face; 22: main flank face portion; 30: outer circumferential surface; 31: return face; 32: main outer circumferential surface portion; 40: flute portion; 40a: side end portion; 40b: intersection; 40c: tangent line; 50: thinning face; 100: drill; A: axis; B: pitch; C: direction; D: drill diameter; E1, E2: wear location; H1, H2, H3, H4: depth; L: range; T: thickness.

The invention claimed is:

1. A drill comprising:
a rake face;
a flank face continuous to the rake face; and
an outer circumferential surface continuous to both the rake face and the flank face, wherein
a ridgeline between the rake face and the flank face constitutes a cutting edge,
a ridgeline between the rake face and the outer circumferential surface constitutes an outer circumferential end,
a groove is provided cyclically in the rake face to extend at an angle relative to an axis of the drill, the angle being larger than a helix angle of the drill,
the groove has a depth of more than or equal to 1.5 µm,
the groove is inclined relative to the cutting edge,
the groove has a plurality of groove portions, and
each of the plurality of groove portions is continuous to the cutting edge.

2. The drill according to claim 1, wherein
the drill has a substrate and a coating film provided on the substrate,
the rake face, the flank face, and the outer circumferential surface are constituted of the coating film, and
the groove is a first groove provided in the rake face formed by the coating film and extending from the cutting edge toward the outer circumferential end, and the first groove has a depth of more than or equal to 1.5 µm.

3. The drill according to claim 2, wherein a second groove is cyclically provided in the substrate at a location corresponding to the first groove, and the second groove has a depth of more than or equal to 1.5 µm.

4. The drill according to claim 3, wherein a thickness of the coating film is larger than the depth of the second groove.

5. The drill according to claim 3, wherein the coating film further includes a thinning face continuous to both the flank face and the rake face, and a third groove is provided in the rake face to extend toward the outer circumferential end from a ridgeline between the thinning face and the rake face.

6. The drill according to claim 4, wherein the third groove has a depth of more than or equal to 1.5 µm.

7. The drill according to claim 4, wherein a maximum height roughness of the thinning face is smaller than a maximum height roughness of the rake face.

8. The drill according to claim 2, wherein
the drill is configured to be rotatable around the axis,
the coating film further includes a flute portion continuous to the rake face and provided in a form of a helix around the axis.

9. The drill according to claim 8, wherein a value obtained by subtracting the helix angle from the angle of an extending direction of the groove relative to the axis is more than 0° and less than or equal to 15°.

10. The drill according to claim 1, wherein the rake face has a maximum height roughness of more than or equal to 1.5 µm and less than or equal to 50 µm.

11. The drill according to claim 1, wherein
a pitch between the plurality of groove portions is more than or equal to 10 µm and less than or equal to 70 µm.

12. The drill according to claim 1, wherein
the flank face has a cutting-edge treated face and a main flank face portion, the cutting-edge treated face constituting the cutting edge, the main flank face portion being continuous to the cutting-edge treated face, the main flank face portion being inclined relative to the cutting-edge treated face, and
a maximum height roughness of the cutting-edge treated face is smaller than a maximum height roughness of the rake face.

13. The drill according to claim 1, wherein
the outer circumferential surface has a return face and a main outer circumferential surface portion, the return face constituting the outer circumferential end, the main outer circumferential surface portion being continuous to the return face, the main outer circumferential surface portion being inclined relative to the return face, and
a maximum height roughness of the return face is smaller than a maximum height roughness of the rake face.

\* \* \* \* \*

UNITED STATES PATENT AND TRADEMARK OFFICE
CERTIFICATE OF CORRECTION

PATENT NO. : 11,141,799 B2
APPLICATION NO. : 16/316777
DATED : October 12, 2021
INVENTOR(S) : Shinya Nakata Page 1 of 1

It is certified that error appears in the above-identified patent and that said Letters Patent is hereby corrected as shown below:

In the Claims

In Claim 6, Column 14, Line 6, "claim 4," should read --claim 5,--.

In Claim 7, Column 14, Line 8, "claim 4," should read --claim 5,--.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*